Nov. 27, 1923. 1,475,462
E. A. TURNQUIST
UNIVERSAL JOINT
Filed Aug. 11, 1922 2 Sheets-Sheet 1
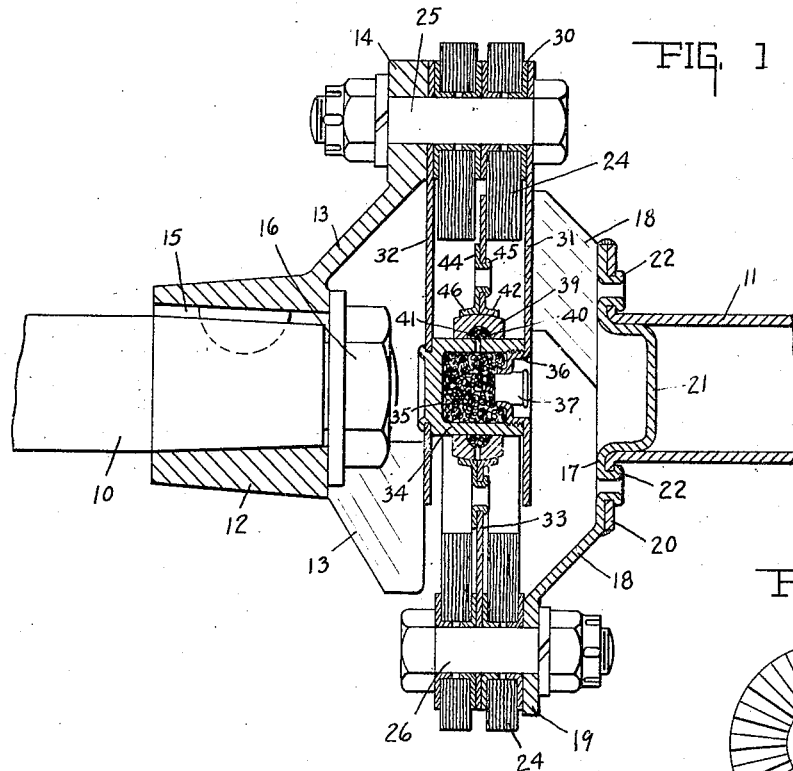
FIG. 1
FIG. 3
FIG. 4
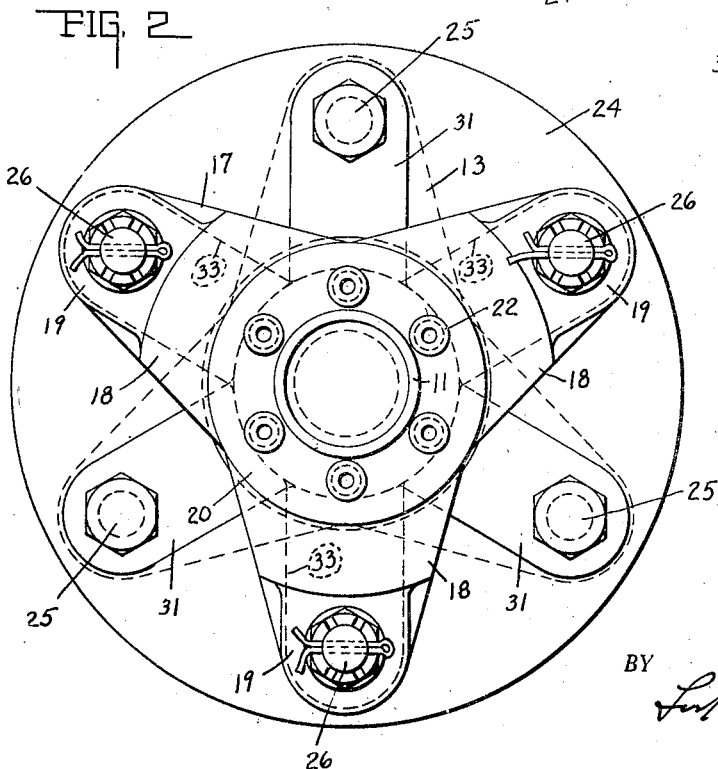
FIG. 2
INVENTOR.
EDWARD A. TURNQUIST.
BY
ATTORNEYS.

Nov. 27, 1923.
E. A. TURNQUIST
1,475,462
UNIVERSAL JOINT
Filed Aug. 11, 1922   2 Sheets-Sheet 2
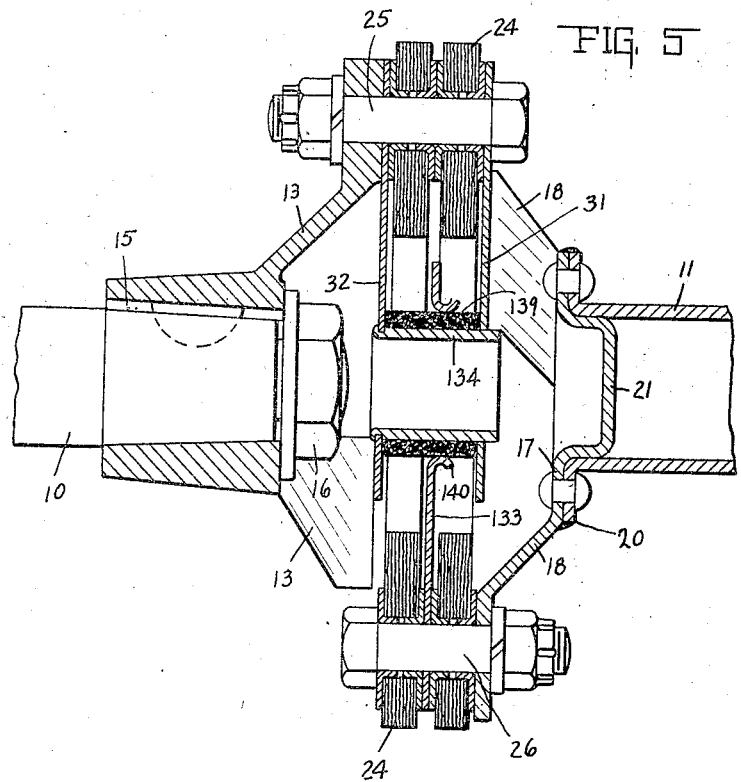
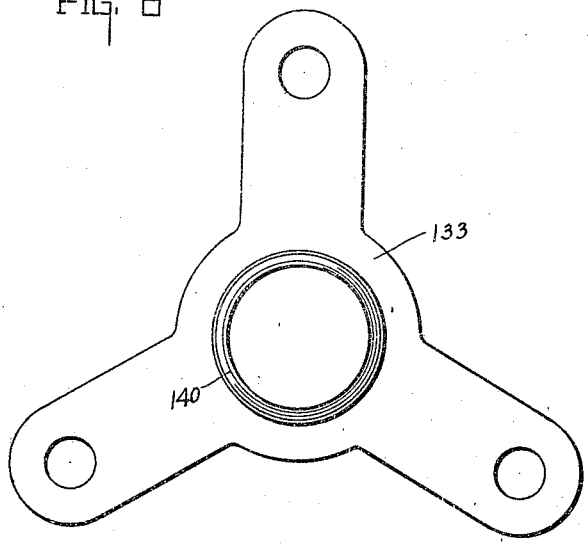
INVENTOR.
EDWARD A. TURNQUIST.
BY
ATTORNEYS.

Patented Nov. 27, 1923.

1,475,462

UNITED STATES PATENT OFFICE.

EDWARD A. TURNQUIST, OF WABASH, INDIANA.

UNIVERSAL JOINT.

Application filed August 11, 1922. Serial No. 581,078.

*To all whom it may concern:*

Be it known that I, EDWARD A. TURNQUIST, a citizen of the United States, and a resident of Wabash, county of Wabash, and State of Indiana, have invented a certain new and useful Universal Joint; and I do hereby declare that the following is a full, clear, and exact description thereof, reference being had to the accompanying drawings, in which like numerals refer to like parts.

This improvement relates to a universal joint construction of the compound type of the character shown in my former application, Serial No. 551,489, filed April 11, 1922. Said former construction included an equalizing yielding spider plate mounted on all the bolts extending through the annular member secured between the spider frames on the driving and driven shafts or tubes. A result of that construction was that the repeated flexing of the equalizing plate would comparatively soon cause it to crystallize, weaken and break. One object of this invention is to overcome that difficulty.

The chief feature of the present invention is the employment in such a joint of a plurality of equalizing plates, one being secured in connection with the arms of the spider frame connected with the driving shaft or member and the other equalizing plate being secured in connection with the arms of the other spider frame, and said equalizing plates being largely independent in action. In this construction, therefore, no equalizing plate is secured by all of the bolts extending through the device, but one plate is mounted on one set of bolts and the other equalizing plate is mounted on the other set of bolts.

Another feature of this invention consists in providing a plurality of equalizing plates mounted in connection with one spider frame and at opposite sides of the annular member of the joint, and locating another equalizing plate between said first-mentioned equalizing plates and connected with the other spider frame. This feature of the invention is carried further herein by mounting an annular bearing member in the center of one set of equalizing plates and arranging another equalizing plate so that it will frictionally engage said bearing member. This feature of the invention is still further advanced by making the outer surface of said bearing member spherical and the inner periphery of the last-mentioned equalizing plate likewise spherical so that they can have relative movement in the operation of the joint.

Another feature of the invention consists in means of forming and securing the torque tube to one of the spider frames, whereby the connection will be conveniently made and be very strong when made.

The full nature of the invention will be understood from the accompanying drawings and the following description and claims:

In the drawings, Figure 1 is a central sectional view of driving and driven shafts connected by said joint construction. Fig. 2 is a face view of the same. Fig. 3 is a face view of the flanged bushing. Fig. 4 is an edge view of two of said bushings. Fig. 5 is a central vertical section of such a joint, but a modified form as compared with what is shown in Fig. 1. Fig. 6 is a side view of one of the equalizing spider plates.

The specific construction shown in the drawings illustrates the invention as adapted for use in automobiles. There is shown a propeller shaft 10 and a torque tube 11. Said shaft 10 supports a hub 12 integral with a spider frame 13 having three radially extending arms terminating in bearings 14. A key 15 causes that shaft to rotate said spider and the spider is held on the shaft by a nut 16.

The torque tube 11 also is secured to a rigid spider frame 17 having three equally spaced radial arms 18 terminating in bearings 19. The end of the torque tube 11 is upset so as to have an outwardly extending annular flange 20. The central portion of the spider 17 is also upset to form the central circular projection 21 adapted to fit snugly within the end of the torque tube and rivets 22 are punched out of the spider 17 and extend through the flange 20 and their outer ends are hammered down and the flange is then welded around its edge to the spider so as to permanently secure the torque tube and spider member together in a very strong construction, inasmuch as the end of the torque tube fits tightly against the parallel portion of the spider and the union between the two members is made very secure by reason of the rivets being punched out of one of said members.

A flexible annulus construction 24 is mounted on clamping bolts 25 and 26, the bolts 25 extending through the bearings 14 of the transmission spider 13 and the bolts 26 extending through the arms 19 to the rigid spider 17, as seen in Fig. 1. Said annulus consists of two sets of rings 24 made of thermoid or other hard flexible material, such as is used in joints of this type, and each set of rings is provided with two oppositely located bushings 30 through which the bolts 25 and 26 extend, as shown in Fig. 1. Said bushings have a radially-extending annular portion, which is corrugated on both sides, as shown in Fig. 4, and a central hub-like portion which surrounds the bolt. They are clamped against the thermoid rings 24 by the nuts on the bolts 25 and 26.

The equalizing construction of this coupling consists of three equalizing spider plates 31, 32 and 33. The spiders 31 and 32 are as shown in Fig. 6 and consist of a central annular portion with three radially extending arms or plates. Said spiders 31 and 32 are mounted on three bolts 25, the spider 31 being on one side of the annulus and the spider 32 on the other side, as shown in Fig. 1, and lying against the bushings 30. A bushing 34, cup-shaped in form, is located centrally of the construction and at the closed end extends through a hole in the spider 32 and the outside end is broken down against the outer surface of the spider 32 for securing the two together. Said bushing contains felt 35 for lubricating fluid. The outer end of said bushing 34 is internally threaded to screw on a nipple 36 punched inward from the spider 31 and which has a central opening closed by a cap 37. The cap is removed for introducing felt or lubricating oil.

The centrally-located equalizing spider 33 is mounted on the three bolts 26 and is substantially the same shape as the spiders 31 and 32 excepting that it is centrally mounted on an annular bearing member 39 which surrounds and is mounted on the bushing 34, as shown in Fig. 1. The outer surface of the bearing member 39 is cylindrical, the transverse curvature being concentric with the center of said member 39, and said member is preferably made of oil-less metal and has in its inner surface an annular lubricating chamber 40 adapted to communicate with the interior of the lubricating felt in the bushing 34, through the holes 41. The equalizing spider 33 has a laterally-extending flange 42 curved to fit on the bearing member 39 and an annular plate 44 is riveted to the central portion of the spider 33 by the rivets 45 and it has a flange 46 extending opposite to the flange 42 and likewise curved to fit on the bearing member 39, as shown.

From the foregoing description of the construction it will be understood that the two classes of equalizing spider plates are on different sets of bolts or connections with the flexible annulus, one set of equalizing spiders being in a sense associated with and corresponding to the rigid spider 13 on the propeller shaft and the other spider being in a sense secured to and corresponding with the rigid spider 17 on the torque tube. Hence, no one of said equalizing spiders or plates is subject to excessive bending in the transmission or power from the shaft to the tube, or more accurately speaking from the bolts 25 to the bolts 26. Therefore, there is no danger of the spiders' plates being crystallized and quickly injured. The arms of the spider plate are thus maintained in substantially fixed relation with the central or body portion thereof because they are on the same set of bolts and are subject to substantially the same action, movement or influence. The spiders are mounted in relation to each other so that they can have individual freedom of movement with relation to the bushing 34 connected with the other spiders, by reason of the concentric mounting of said central spider loosely on the spherically disposed surface of the bearing member 39, and that will prevent any undue bending or twisting and crystallization of the equalizing members due to the repeated bending thereof, as the angle of the torque tube changes with the motion of the automobile.

The modified form of the invention illustrated in Fig. 5 differs from that shown in the previous figures in the following particulars: The central bushing 134 is entirely tubular and secured to the spider 32 in substantially the same manner as shown in Fig. 1. Its chief function is to support the bearing member 139 which is merely a band surrounding the bushing 134 and lying between the spiders 31 and 32. The central spider 133 surrounds said bearing member 139 and loosely engages it, the engaging portion being the inner peripheral edge 140 thereof turned laterally so as to provide an annular convex surface engaging the bearing member 139. This enables the equalizing spider 133 to have such lateral movement relative to the spiders 31 and 32 as the operation of the device may require.

While two particular forms of the invention are herein shown and described, the invention is not limited to the details of the constructions shown in the drawings herein.

The invention claimed is:

1. A universal joint construction including the combination with driving and driven spider frames, and an annular member secured alternately in succession to the arms of the spider frames, of a plurality of equalizing yielding spider plates connected respectively with said spider frames, said spider plates being spaced apart.

2. A universal joint construction including the combination with driving and driven spider frames, an annular member between them, and two sets of means for securing the annular member alternately in succession to the arms of the spider frames, of a plurality of equalizing yielding spider plates secured respectively on said two sets of securing means, said spider plates being spaced apart so as to have independent action.

3. A universal joint construction including the combination with driving and driven spider frames, an annular member between them, and two sets of means for securing the annular member alternately in sucession to the arms of the spider frames, of a plurality of equalizing yielding spider plates secured respectively on said two sets of securing means, said spider plates being at opposite sides of said annular member so as to have independent action.

4. A universal joint construction including the combination with driving and driven spider frames, an annular member between them, and bolts for securing said annular member alternately and in succession to the arms of said spider frames, of a plurality of equalizing yielding spider plates, one of said plates being mounted on the bolts connected with one spider frame and the other spider plate being mounted on the bolts connected with the other spider frame, said spider plates being spaced apart so as to have independent action.

5. A universal joint construction including the combination with driving and driven spider frames, an annular member between them, and bolts for securing said annular member alternately and in succession to the arms of said spider frames, of a plurality of yielding spider plates mounted on the bolts connected with one spider frame at opposite sides of said annular member, and an equalizing yielding spider plate between the aforesaid spider plates and mounted on the bolts connected with the other spider frame and being free to act independently of the aforesaid spider plates.

6. A universal joint construction including the combination with driving and driven spider frames, a plurality of annular members between them beside each other but spaced from each other, and bolts for securing said annular members alternately and in succession to the arms of said spider frames, of a plurality of equalizing yielding spider plates mounted on said bolts connected with one of said spider plates and at opposite sides of said annular members, and an intermediate equalizing yielding spider plate mounted on the bolts connected with the other spider frame and located between said annular members.

7. A universal joint construction including the combination with driving and driven spider frames, an annular member between them, and bolts for securing said annular member alternately and in succession to the arms of said spider frames, of a plurality of equalizing yielding spider plates mounted on the bolts connected with one of said spider frames and spaced apart, an annular bearing member located centrally of said spider plates and carried thereby, and another equalizing yielding spider plate mounted on the bolts connected with the other spider frame and located between the aforesaid spider plates and frictionally engaging said bearing member.

8. A universal joint construction including the combination with driving and driven spider frames, an annular member between them, and bolts for securing said annular member alternately and in succession to the arms of said spider frames, of a plurality of equalizing yielding spider plates mounted on the bolts connected with one of said spider frames and spaced apart, an annular bushing located centrally of said spider plates and carried thereby, an annular bearing member loosely surrounding said bushing and located between said spider plates, and another equalizing yielding spider plate mounted on the bolts connected with the other spider frame and located between the aforesaid spider plates and frictionally engaging said bearing member.

9. A universal joint construction including the combination with driving and driven spider frames, an annular member between them, and bolts for securing said annular member alternately and in succession to the arms of said spider frames, of a plurality of equalizing yielding spider plates mounted on the bolts connected with one of said spider frames and spaced apart, an annular bushing located centrally of said spider plates and carried thereby, an annular bearing member loosely surrounding said bushing and located between said spider plates, the outer periphery of said bearing member being spherical, and another equalizing yielding spider plate mounted on the bolts connected with the other spider frame and located between the aforesaid spider plates and surrounding said bearing member and with its inner periphery spherical to fit said bearing member.

10. A universal joint construction including the combination with driving and driven spider frames, an annular member between them, and bolts for securing said annular member alternately and in succession to the arms of said spider frames, of a plurality of equalizing yielding spider plates mounted on the bolts connected with one of said spider frames and spaced apart, an annular bushing located centrally of said spider plates and carried thereby, an annular bearing member loosely surrounding said bushing and located between said spider plates, another equalizing yielding spider plate mounted on the bolts connected with the other spider frame and located between the aforesaid spider plates and frictionally engaging said bearing member, said bearing member having an annular lubricating chamber in its inner periphery and said bushing having oil openings to the chamber in said bearing member, and means for closing said bushing so it can contain lubricating material.

11. The combination with a driving shaft and a driven tube in alignment with each other, and a universal joint including spider frames for connecting said members, the spider frame adjacent said driven tube having a flat annular portion and said tube having an outwardly flanged end portion bearing against the flat portion of the spider frame, and rivets punched from one of said portions through the other and hammered down for securing said portions rigid together.

12. The combination with a driving shaft and a driven tube in alignment with each other, and a universal joint including spider frames for connecting said members, the spider frame adjacent said driven tube having a central annular outwardly extending portion projecting and fitting within said driven tube, and an annular flat portion surrounding said central extension, the end of the tube surrounding the central extension on the spider frame having an outwardly extending flange fitting against the adjacent portion of said spider frame, and rivets extending through said portions for securing them rigidly together.

In witness whereof, I have hereunto affixed my signature.

EDWARD A. TURNQUIST.